M. SLAWECKI.
YIELDABLE KEEPER FOR TURN TABLES.
APPLICATION FILED NOV. 6, 1912.
1,050,570.
Patented Jan. 14, 1913.
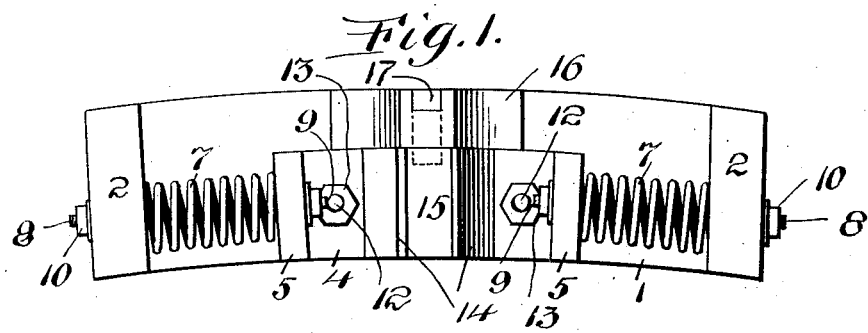
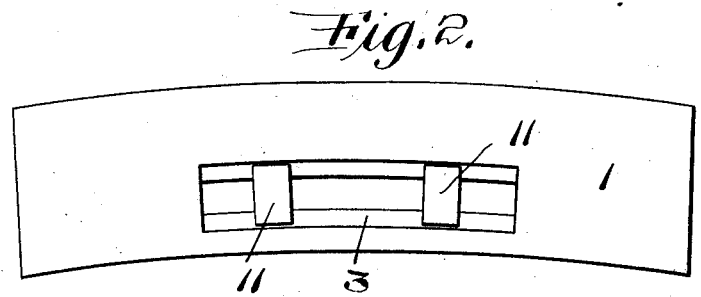
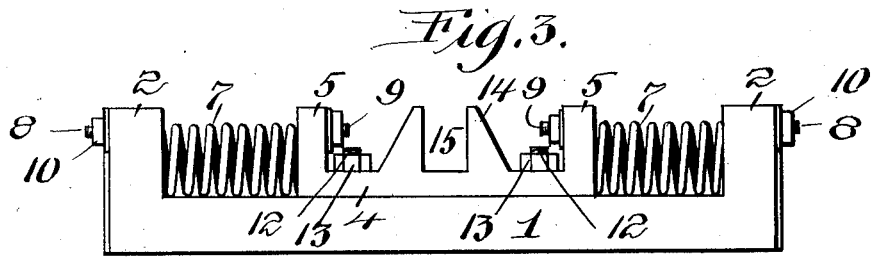
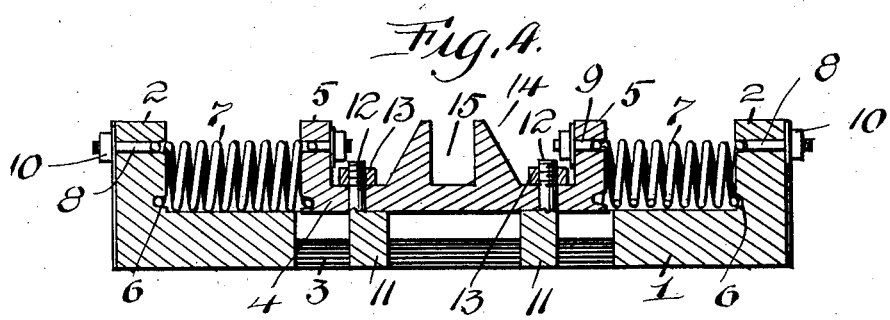
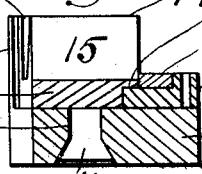
WITNESSES
INVENTOR
Michael Slawecki
ATTORNEYS
COLUMBIA PLANOGRAPH CO., WASHINGTON, D. C.

UNITED STATES PATENT OFFICE.

MICHAEL SLAWECKI, OF PHILADELPHIA, PENNSYLVANIA.

YIELDABLE KEEPER FOR TURN-TABLES.

1,050,570.  Specification of Letters Patent.  Patented Jan. 14, 1913.

Application filed November 6, 1912. Serial No. 729,892.

*To all whom it may concern:*

Be it known that I, MICHAEL SLAWECKI, a subject of the Emperor of Austria-Hungary, residing at Philadelphia, in the county of Philadelphia and State of Pennsylvania, have invented certain new and useful Improvements in Yieldable Keepers for Turn-Tables, of which the following is a specification, reference being had therein to the accompanying drawing.

This invention relates to a yieldable bolt keeper for turn-table, and the primary object of my invention is to provide a keeper that can be easily mounted upon a turn-table for yieldably holding the bolt that connects the turn-table to the stationary track, the yieldable keeper preventing the vibrations of the turn-table from breaking a bolt when a train is passing over the same.

A further object of this invention is to provide a yieldable keeper consisting of comparatively few parts that are inexpensive to manufacture, easy to assemble and highly efficient for the purposes for which they are intended.

With the above and other objects in view, the invention resides in a novel construction, combination and arrangement of parts to be hereinafter specifically described and then claimed.

Reference will now be had to the drawing, wherein:—Figure 1 is a top plan of the yieldable keeper. Fig. 2 is a bottom plan of the same. Fig. 3 is a front elevation of the keeper. Fig. 4 is a longitudinal sectional view of the same, and Fig. 5 is a cross sectional view of the keeper.

A yieldable keeper in accordance with this invention comprises an oblong body 1 that is slightly curved to conform to the periphery or rounded edges of a railway turn-table. The body 1 has end walls 2 and intermediate the ends thereof said body has a longitudinal dove-tailed slot 3. Slidably mounted upon the body 1 is a keeper member 4 and said member has end walls 5 confronting the end wall 2 of the body 1. The confronting sides of the walls 2 and 5 are provided with seats 6 for the end convolutions of coiled compression springs 7, said springs holding the keeper member 4 normally intermediate the walls 2. The end convolutions of the springs 7 terminate in bolts 8 and these bolts extend through openings 9 provided therefor in the walls 2 and 5. The nuts 10 are screwed upon the ends of the bolts to hold the springs 7 in position. The keeper member 4 is provided with detachable dove-tailed tongues 11 and these tongues are arranged in the dove-tailed slot 3 to guide the member 4 in a movement longitudinally of the body 1. The tongues 11 are made detachable whereby the parts can be easily assembled and said tongues are preferably held by bolts 12 and nuts 13, said bolts being formed integral with the upper ends of the tongues 11. The keeper member 4 intermediate the ends thereof has an enlargement 14, and said enlargement is slotted, as at 15, to receive the end of a turn table latch. The keeper member 4 is of a less width than the body 1 and to lock said keeper member relatively to the body, the body 1 is provided with a strap 16 and movably arranged in said strap is a latch 17 adapted to extend into a recess 18 provided therefor in the keeper member 4. With the latch 17 out of engagement with the keeper member, said member can shift between the end walls 2 of the body 1. The member 4, however, is limited in its movement by the tongues 11.

What I claim is:—

A yieldable bolt keeper for turn-table comprising an oblong body having end walls, said body having a longitudinal dove-tailed slot formed therein, a keeper member movably arranged upon said body and having end walls, coiled compression springs arranged upon said body and having the end convolutions thereof molded to the end walls of said body and the end walls of said member, depending detachable dove-tailed tongues carried by said member and extending into the slot of said body for limiting the movement of said member, said member having a central enlargement provided with a slot, and a latch arranged upon said body for locking said member relatively thereto.

In testimony whereof I affix my signature in the presence of two witnesses.

MICHAEL SLAWECKI.

Witnesses:
ADAM LORENC,
PETER KEDAA.